United States Patent
Komura

(10) Patent No.: US 9,872,217 B2
(45) Date of Patent: Jan. 16, 2018

(54) RADIO COMMUNICATION SYSTEM, RADIO COMMUNICATION TERMINAL, RADIO COMMUNICATION APPARATUS, AND COMMUNICATION METHOD

(71) Applicant: KYOCERA CORPORATION, Kyoto (JP)

(72) Inventor: Mayumi Komura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/779,829

(22) PCT Filed: Mar. 26, 2014

(86) PCT No.: PCT/JP2014/001749
§ 371 (c)(1),
(2) Date: Sep. 24, 2015

(87) PCT Pub. No.: WO2014/156148
PCT Pub. Date: Oct. 2, 2014

(65) Prior Publication Data
US 2016/0057673 A1  Feb. 25, 2016

(30) Foreign Application Priority Data

Mar. 26, 2013 (JP) .................................. 2013-064996

(51) Int. Cl.
*H04W 36/14* (2009.01)
*H04W 88/06* (2009.01)

(52) U.S. Cl.
CPC ............ *H04W 36/14* (2013.01); *H04W 88/06* (2013.01)

(58) Field of Classification Search
CPC ..................................................... H04W 36/14
(Continued)

(56) References Cited

U.S. PATENT DOCUMENTS 6,981,055 B1 * 12/2005 Ahuja ..................... H04L 45/04
370/401
7,107,563 B1 * 9/2006 Kong .................. G06F 17/5077
716/128
(Continued)

FOREIGN PATENT DOCUMENTS

FI   WO2014/135743 * 3/2013 ............ H04W 60/00
JP   2005-109899 A   4/2005
(Continued)

OTHER PUBLICATIONS

International Search Report from PCT/JP2014/001749 dated Jun. 24, 2014.
(Continued)

*Primary Examiner* — Ronald B Abelson
(74) *Attorney, Agent, or Firm* — Studebaker & Brackett PC

(57) ABSTRACT

Provided are a radio communication system, a radio communication apparatus, a radio communication terminal, and a communication method those being capable of facilitating handover of a dual terminal to a base station corresponding to the other communication scheme, thereby improving frequency utilization efficiency of the entire radio communication system that employs a plurality of communication schemes. Specifically, a first radio communication apparatus (1) is provided with a transmission unit (100) for transmitting information (106) about a backbone line shared with a second radio communication apparatus (2). A first radio communication terminal (3) and a second radio communication terminal (4) are provided with a selection unit (32) and a selection unit (41), respectively, for selecting a radio communication apparatus to connect based on the information (106) received.

6 Claims, 8 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 9,130,951 | B2* | 9/2015 | Hameleers | ............ H04W 48/18 |
| 2002/0124106 | A1* | 9/2002 | Dolganow | .......... H04L 12/5695 |
| | | | | 709/242 |
| 2004/0066756 | A1 | 4/2004 | Ahmawaara et al. | |
| 2008/0176552 | A1* | 7/2008 | Hamano | ............... H04W 48/18 |
| | | | | 455/422.1 |
| 2008/0182615 | A1 | 7/2008 | Xue et al. | |
| 2010/0027468 | A1* | 2/2010 | Rajadurai | ............. H04W 48/12 |
| | | | | 370/328 |
| 2011/0058541 | A1 | 3/2011 | Fok et al. | |
| 2011/0069714 | A1* | 3/2011 | Le Pennec | ............ H04L 45/00 |
| | | | | 370/401 |
| 2012/0208534 | A1* | 8/2012 | Swaminathan | ....... H04W 8/183 |
| | | | | 455/434 |
| 2013/0121241 | A1* | 5/2013 | Sebire | ................... H04W 48/18 |
| | | | | 370/328 |

FOREIGN PATENT DOCUMENTS

| | | |
|---|---|---|
| JP | 2008-042913 A | 2/2008 |
| WO | 2004/034714 A1 | 4/2004 |
| WO | 2008/096702 A1 | 8/2008 |
| WO | 2009/139500 A1 | 11/2009 |

OTHER PUBLICATIONS

Concise Explanation of Written Opinion of the International Searching Authority from PCT/JP2014/001749 dated Jun. 24, 2014.

* cited by examiner

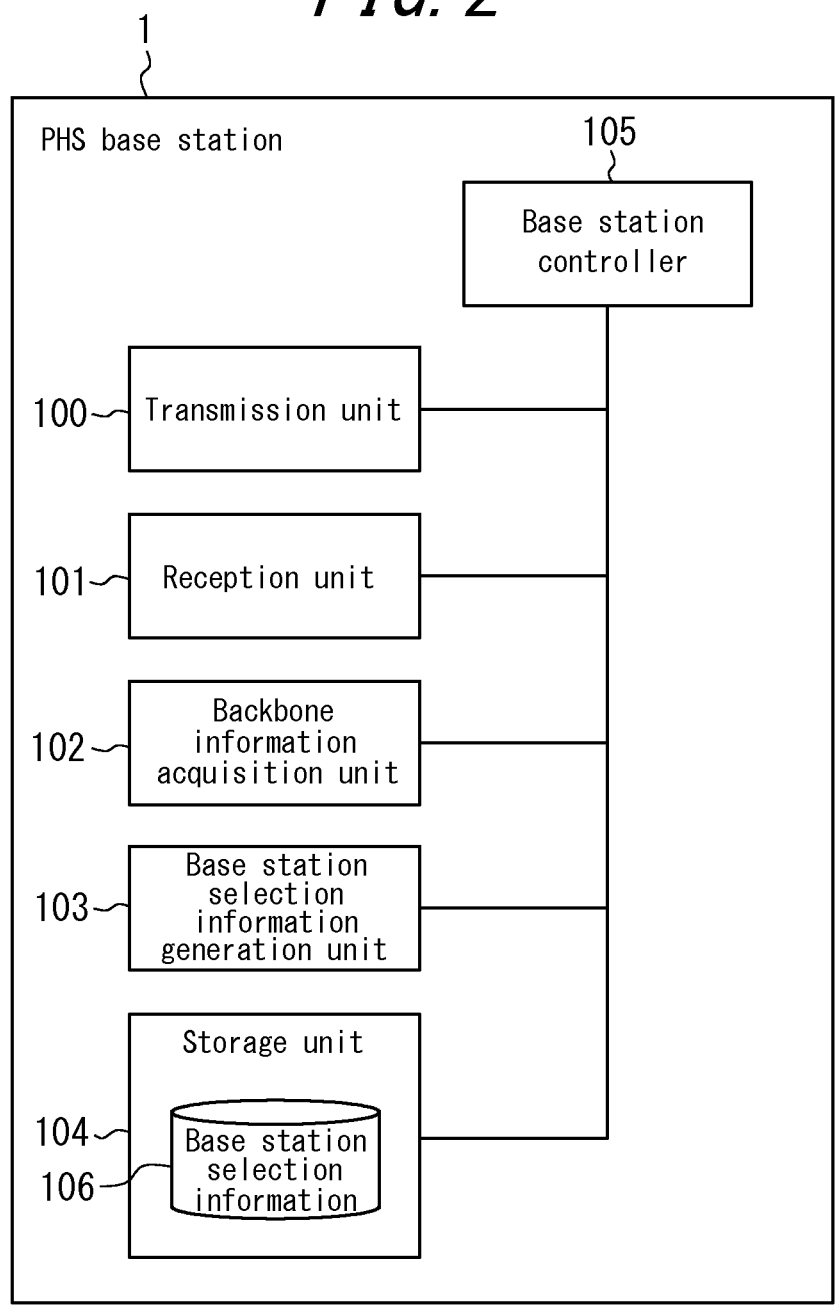

RADIO COMMUNICATION SYSTEM, RADIO COMMUNICATION TERMINAL, RADIO COMMUNICATION APPARATUS, AND COMMUNICATION METHOD

CROSS REFERENCE TO RELATED APPLICATION

This application claims priority to and the benefit of Japanese Patent Application No. 2013-64996 (filed on Mar. 26, 2013), the entire contents of which are incorporated herein by reference.

TECHNICAL FIELD

This disclosure relates to a radio communication system, a radio communication terminal, a radio communication apparatus, and a communication method.

BACKGROUND

In recent years, as a means to deal with an increase in a traffic of a radio communication, there have been a dual terminal capable of using a plurality of communication schemes such as PHS and 3G. Such a dual terminal is advantageous as being capable of, when, for example, the dual terminal cannot connect to a base station corresponding to one of the communication schemes, connecting to a base station corresponding to the other communication scheme (for example, PLT 1).

CITATION LIST

Patent Literature

PTL 1: Japanese Patent Application Laid-Open Publication No. 2005-109899

Incidentally, the dual terminal, after connecting to the base station corresponding to one of the communication schemes, may have communication quality degraded by interference or the like. In this case, the dual terminal may control to switchover the connection to the base station corresponding to the other communication scheme, in order to maintain the communication.

However, whether the switchover of the connection to the base station corresponding to the other communication scheme is actually possible is unknown until the dual terminal searches by using the other communication scheme and detects the base station corresponding to the other communication scheme. Also, even when the dual terminal may detect the base station corresponding to the other communication scheme, in case of low signal strength for reasons such as a long distance between the base station and the dual terminal, a significant improvement in the communication condition may not be expected from the switchover of the connection. Therefore, when the communication quality of one of the communication scheme is degraded or the like, the dual terminal does not control to simply switchover the connection to the other communication scheme. Therefore, handover of the dual terminal to the base station corresponding to the other communication scheme has been suppressed, hindering an improvement in frequency utilization efficiency of an entire radio communication system.

In view of the above problem, therefore, it could be helpful to provide a radio communication system, a radio communication terminal, a radio communication apparatus, and a communication method those being capable of facilitating the handover of the dual terminal to the base station corresponding to the other communication scheme, thereby improving the frequency utilization efficiency of the entire radio communication system that employs a plurality of communication schemes.

SUMMARY

In order to solve the above problem, our radio communication system is a radio communication system having a plurality of first radio communication apparatuses corresponding to a first communication scheme, a second radio communication apparatus corresponding to a second communication scheme, a first radio communication terminal corresponding to the first communication scheme, and a second radio communication terminal corresponding to both the first communication scheme and the second communication scheme, wherein the first radio communication apparatus has a transmission unit for transmitting information about a backbone line shared with the second radio communication apparatus, and the first radio communication terminal and the second radio communication terminal have respective selection units for selecting the radio communication apparatus to connect based on the information received.

In the radio communication system, the selection unit of the second radio communication terminal, in order to carry out a radio communication by employing the first communication scheme, selects the first radio communication apparatus sharing the backbone line with the second radio communication apparatus as a connection destination.

In the radio communication system, the information transmitted by the transmission unit contains a distance between the second radio communication apparatus sharing the backbone line and the radio communication apparatus of its own.

In the radio communication system, the first radio communication apparatus has a storage unit for storing the information transmitted by the transmission unit and, based on the information stored in the storage unit, controls connection of the radio communication terminal connected to the first radio communication apparatus itself.

In the radio communication system, the selection unit of the first radio communication terminal selects the first radio communication apparatus having a backbone line of its own as the connection destination.

Also, our radio communication terminal is a radio communication terminal of a radio communication system having a plurality of first radio communication apparatuses corresponding to a first communication scheme and a second radio communication apparatus corresponding to a second communication scheme, the radio communication terminal includes:

a selection unit for selecting the radio communication apparatus to connect based on information about a backbone line shared between the first radio communication apparatus and the second radio communication apparatus.

The radio communication terminal corresponding to the first communication scheme, wherein the selection unit selects the first radio communication apparatus having the backbone line of its own as the connection destination.

The radio communication terminal corresponding to both the first communication scheme and the second communication scheme, wherein the selection unit selects the first radio communication apparatus sharing the backbone line with the second radio communication apparatus corresponding to the second communication scheme as the connection destination.

Also, our radio communication apparatus, serving as a first radio communication apparatus corresponding to a first communication scheme, and having a transmission unit for transmitting information about a backbone line shared with a second communication apparatus corresponding to a second communication scheme.

In the radio communication apparatus, the information transmitted by the transmission unit contains a distance between the second radio communication apparatus sharing the backbone line and the radio communication apparatus of its own.

The radio communication apparatus includes a storage unit for storing the information transmitted by the transmission unit and, based on the information stored in the storage unit, controls connection of the radio communication terminal connected to the radio communication apparatus itself.

Further, our communication method of a radio communication system including a plurality of first radio communication apparatuses corresponding to a first communication scheme, a second radio communication apparatus corresponding to a second communication scheme, a first radio communication terminal corresponding to the first communication scheme, and a second radio communication terminal corresponding to both the first communication scheme and the second communication scheme, the communication method includes:

a step of transmitting, by the first radio communication apparatus, information about a backbone line shared with the second communication apparatus; and a step of selecting, by the first radio communication terminal and the second communication terminal, the radio communication apparatus to connect based on the information received.

According to the present disclosure, handover of a dual terminal to a base station corresponding to the other communication scheme is facilitated, thereby improving frequency utilization efficiency of the entire radio communication system employing a plurality of communication schemes.

BRIEF DESCRIPTION OF THE DRAWINGS

In the accompanying drawings,

FIG. 2 is a functional block diagram illustrating a schematic configuration of a first radio communication apparatus of the radio communication system in FIG. 1;

DETAILED DESCRIPTION

Hereinafter, embodiments will be described with reference to the accompanying drawings.

First Embodiment

Figure 1:
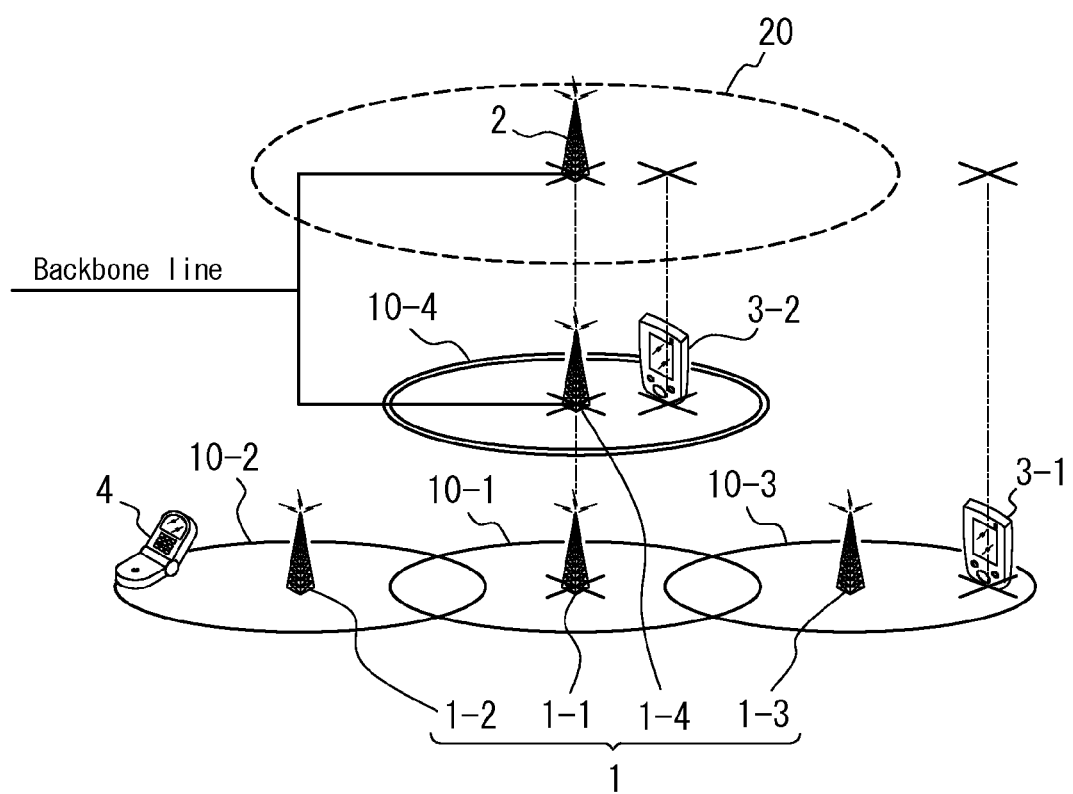
FIG. 1 is a diagram illustrating a schematic configuration of a radio communication system according to a first embodiment.

FIG. 1 is a diagram illustrating a schematic configuration of a radio communication system according to a first embodiment. Hereinafter, a first communication scheme refers to a PHS communication scheme, a second communication scheme refers to a 3G communication scheme, and a radio communication apparatus refers to a base station. The radio communication system includes PHS base stations 1 (1-1, 1-2, 1-3, and 1-4), a 3G base station 2, dual terminals 3 (3-1 and 3-2), and a PHS terminal 4. PHS cells 10 (10-1, 10-2, 10-3, and 10-4) represent geographical ranges allowing communications of the PHS base stations 1, and a 3G cell 20a represents a geographical range allowing a communication of the 3G base station. In FIG. 1, the PHS base station 1-1, the PHS base station 1-4, and the 3G base station 2 locate at the same position. Also, the dual terminal 3-1 locates outside the 3G cell 20 of the 3G base station 2. Further, the dual terminal 3-2 locates within the range of the 3G cell 20 of the 3G base station 2. In general, the cell of the 3G base station 2 is wider than the cell of the PHS base station 1. For convenience, FIG. 1 illustrates four PHS base stations 1, one 3G base station 2, two dual terminals 3, and one PHS terminal 4.

The PHS base station 1 is a base station corresponding to the PHS communication scheme and may connect to the dual terminals 3 and the PHS terminal 4 and communicate therewith. Also, the PHS base station 1 issues base station selection information 106, which will be described later. Here, the PHS base stations (1-1, 1-2, and 1-3) do not share the backbone line with the 3G base station 2 but have backbone lines of their own. On the other hand, the PHS base station 1-4 has a backbone line established to be shared with the 3G base station 2, and thus capable of acquiring information about the 3G base station 2 (an operational status, location information, a base station ID, etc.) from the backbone line.

The 3G base station 2 is a base station corresponding to the 3G communication scheme and may connect to the dual terminals 3 and communicate therewith. The 3G base station 2 may have a configuration in which a plurality of RRUs (Remote Radio Units) separated from a BBU (Base Band Unit). In this case, hereinafter, the 3G base station may be read as the RRU of the 3G base station.

The dual terminal 3 is a radio communication terminals capable of using both the PHS communication scheme and the 3G communication scheme. The dual terminal 3 may connect to the PHS base station 1 or the 3G base station 2 and communicate therewith.

Here, the dual terminal 3-1 is connected to the PHS base station 1-3 having the backbone line of its own. In this case, the dual terminal 3-1, before carrying out searching by employing the 3G communication scheme, is unable to determine whether the dual terminal 3-1 itself locates within the range of the 3G cell 20 of the 3G base station 2.

On the other hand, the dual terminal 3-2 is connected to the PHS base station 1-4 that is sharing the backbone line with the 3G base station 2. In this case, the dual terminal 3-2 receives, from the PHS base station 1-4, the base station selection information 106 indicating that the 3G base station 2 locates in the vicinity of the PHS base station 1-4. Accordingly, the dual terminal 3-2, without searching by employing the 3G communication scheme, may determine that the dual terminal 3-2 itself is highly likely to be locating within the range of the 3G cell 20 of the 3G base station 2 based on the base station selection information 106.

The PHS terminal 4 is a radio communication terminal capable of employing the PHS communication scheme but not capable of employing the 3G communication scheme. The PHS terminal 4 may connect to the PHS base station 1 and communicate therewith.

FIG. 2 is a functional block diagram illustrating a schematic configuration of the PHS base station 1 of the radio communication system in FIG. 1. The PHS base station 1 includes a transmission unit 100, a reception unit 101, a backbone information acquisition unit 102, a base station selection information generation unit 103, a storage unit 104 for storing the base station selection information 106, and a base station controller 105.

The transmission unit 100 transmits a radio signal to the dual terminal 3 and the PHS terminal 4. Also, the transmission unit 100 is controlled by the base station controller 105 to periodically transmit (to issue notification of), on a control channel, control information for allowing the dual terminal 3 and the PHS terminal 4 to connect to the PHS base station 1. Further, the transmission unit 100 transmits the base station selection information 106 on the control channel.

The reception unit 101 receives the radio signal from the dual terminal 3 and the PHS terminal 4. Also, the reception unit 101 measures communication quality of the dual terminal 3 and the PHS terminal 4. Hereinafter, the communication quality refers to received signal strength (RSSI).

The backbone information acquisition unit 102 receives, from a backbone line (not illustrated) of the base station of its own, information about the backbone line. The information about the backbone line contains, for example, information about whether there is the 3G base station 2 sharing the backbone line with the PHS base station 1. Preferably, the information about the backbone line, when the PHS base station 1 is sharing the backbone line with the 3G base station 2, contains location information of the 3G base station 2. Also preferably, the information about the backbone line, when the PHS base station 1 is sharing the backbone line with the 3G base station 2, contains ID of the 3G base station for allowing identification of the 3G base station 2. In order to acquire the information about the backbone line from the backbone line, for example, a PHS management apparatus for managing the PHS base station 1, or a 3G management apparatus for managing the 3G base station 2 sharing the backbone line, stores the information about the backbone line. The backbone information acquisition unit 102, from one of the management apparatuses, acquires the information about the backbone line through the backbone line.

The base station selection information generation unit 103, based on the information acquired by the backbone information acquisition unit 102, generates the base station selection information 106 about the backbone line shared between the base station apparatus of the PHS base station 1 and the 3G base station 2.

Figure 3A:
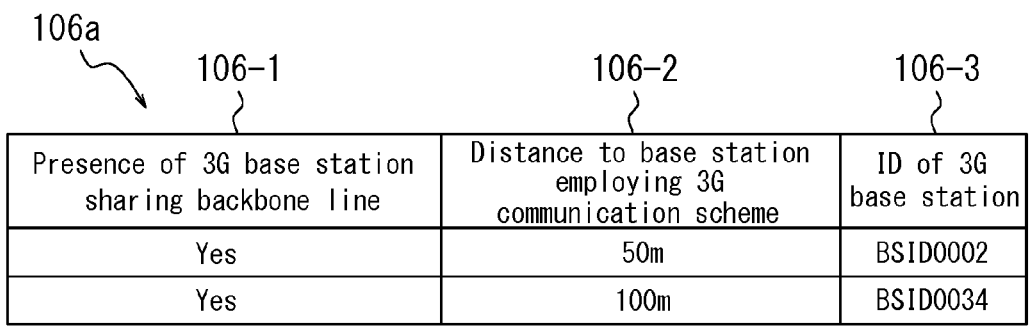
FIG. 3A and FIG. 3B are diagrams illustrating contents of base station selection information of the radio communication system in FIG. 1.
Figure 3B:
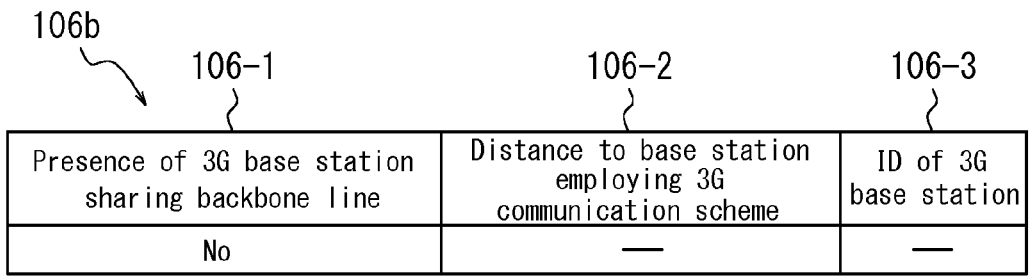

Here, with reference to FIGS. 3A and 3B, the base station selection information 106 will be described. Base station selection information 106a illustrated in FIG. 3A is used when, for example, the PHS base station 1 shares the backbone line with two 3G base stations 2. On the other hand, base station selection information 106b illustrated in FIG. 3B is used when, for example, the PHS base station 1 has the backbone line of its own. The base station selection information contains information 106-1 indicating whether there is the 3G base station 2 sharing the backbone line with the PHS base station 1. The information 106-1 indicating whether there is the 3G base station 2 sharing the backbone line with the PHS base station 1 contains, for example, "Yes" when detecting the 3G base station 2 in operation, or "No" otherwise, based on the information acquired from the backbone line. Preferably, the base station selection information 106 contains a distance 106-2 between the base station of its own and the 3G base station 2 sharing the backbone line therewith. The distance 106-2 is calculated from, for example, location information of the 3G base station 2 acquired from the backbone line and a location of the PHS base station 1. Preferably, the base station selection information 106 contains 3G base station ID 106-3 for allowing identification of the 3G base station that is sharing the backbone line with the PHS base station 1 and employing the 3G communication scheme.

Here, in general, the backbone line to be shared may be established only when the base stations locate geographically close to one another. Therefore, it may be considered that the dual terminal 3-2 connected to the PHS base station 1-4 sharing the backbone line with the 3G base station 2 locates within the 3G cell 20 of the 3G base station 2. It may also be considered that the communication quality of the dual terminal 3-2 becomes less deteriorated due to the distance between the dual terminal 3-2 and the 3G base station 2. Accordingly, the dual terminal 3-2 connected to the PHS base station 1-4 is highly likely to be able to easily carry out handover to the 3G base station 2.

Referring back to FIG. 2, the storage unit 104 is controlled by the base station controller 105 to store the base station selection information 106 generated by the base station selection information generation unit 103.

The base station controller 105 controls the overall operation of the PHS base station 1.

Figure 4:
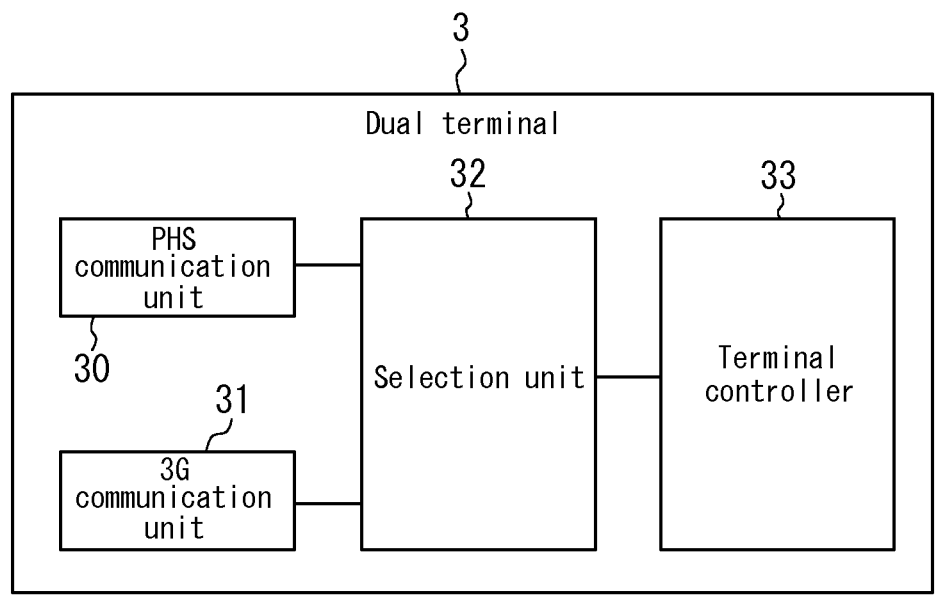
FIG. 4 is a functional block diagram illustrating a schematic configuration of a radio communication terminal corresponding to a second communication scheme of the radio communication system in FIG. 1.

FIG. 4 is a functional block diagram illustrating a schematic configuration of the dual terminal 3 of the radio communication system in FIG. 1. The dual terminals 3 includes a PHS communication unit 30, a 3G communication unit 31, a selection unit 32, and a terminal controller 33.

The PHS communication unit 30 carries out the radio communication with the PHS base station 1 via an antenna. Also, the PHS communication unit 30 receives a plurality of control information and a plurality of base station selection information 106 from a plurality of PHS base stations 1. Further, the PHS communication unit 30 measures quality of the communication with the PHS base station 1.

The 3G communication unit 31 carries out the radio communication with the 3G base station 2 via the antenna. Also, the 3G communication unit 31 measures quality of the communication with the 3G base station 2.

The selecting unit 32, based on the base station selection information 106 received by the PHS communication unit 30, detects the PHS base station 1 sharing the backbone line with the 3G base station 2. The selection unit 32, when detecting one or more PHS base stations 1 that are sharing the backbone line, selects a connection destination therefrom. Preferably, the selection unit 32 preferentially selects the PHS base station 1 having the shortest distance from the 3G base station 2 according to the distance 106-2. On the other hand, when the selection unit 32 detects no PHS base station 1 sharing the backbone line with the 3G base station 2, the selection unit 32 selects the PHS base station 1 having the backbone line of its own as the connection destination.

The terminal controller 33 controls the overall operation of the dual terminal 3.

Figure 5:
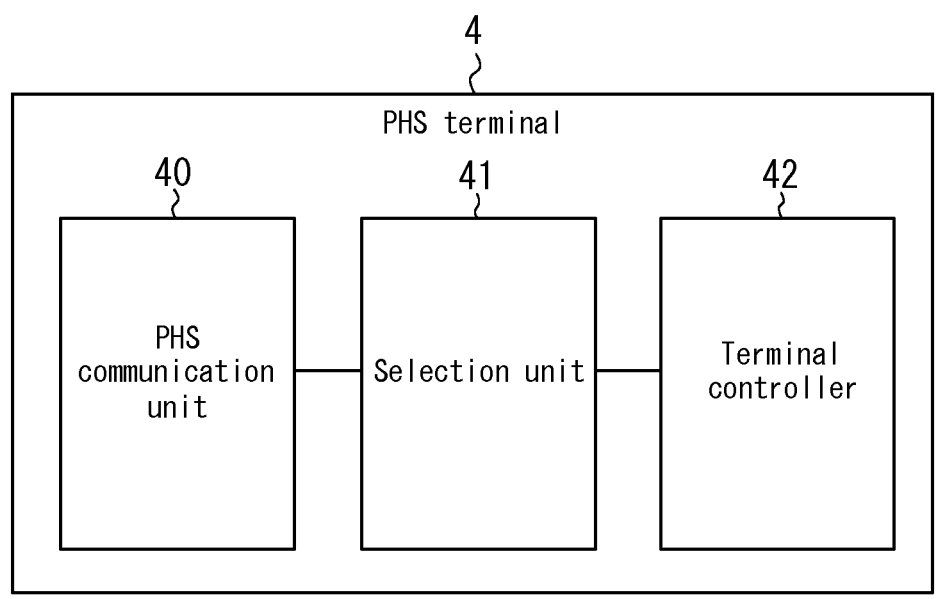
FIG. 5 is a functional block diagram illustrating a schematic configuration of a radio communication terminal non-corresponding to the second communication scheme of the radio communication system in FIG. 1.

FIG. 5 is a functional block diagram illustrating a schematic configuration of the PHS terminal 4 of the radio communication system in FIG. 1. The PHS terminal 4 includes a PHS communication unit 40, a selection unit 41, and a terminal controller 42.

The PHS communication unit 40 carries out the radio communication with the PHS base station 1 via an antenna. Also, the PHS communication unit 40 receives a plurality of control information and a plurality of base station selection information 106 from a plurality of PHS base stations 1. Further, the PHS communication unit 40 measures quality of the communication with the PHS base station 1.

The selection unit 41, based on the base station selection information 106 received by the PHS communication unit 40, detects the PHS base station 1 having the backbone line of its own. When the selection unit 41 detects one or more PHS base stations 1 having the backbone lines of their own, selects the connection destination therefrom. On the other hand, when the selection unit 41 detects no PHS base station 1 having the backbone line of its own, the selection unit 41 selects the connection destination from the PHS base station(s) 1 sharing the backbone line with the 3G base station 2. Preferably, the selection unit 41 preferentially selects the PHS base station 1 having the longest distance from the 3G base station 2 according to the distance 106-2.

The terminal controller 42 controls the overall operation of the PHS terminal 4.

Figure 6:
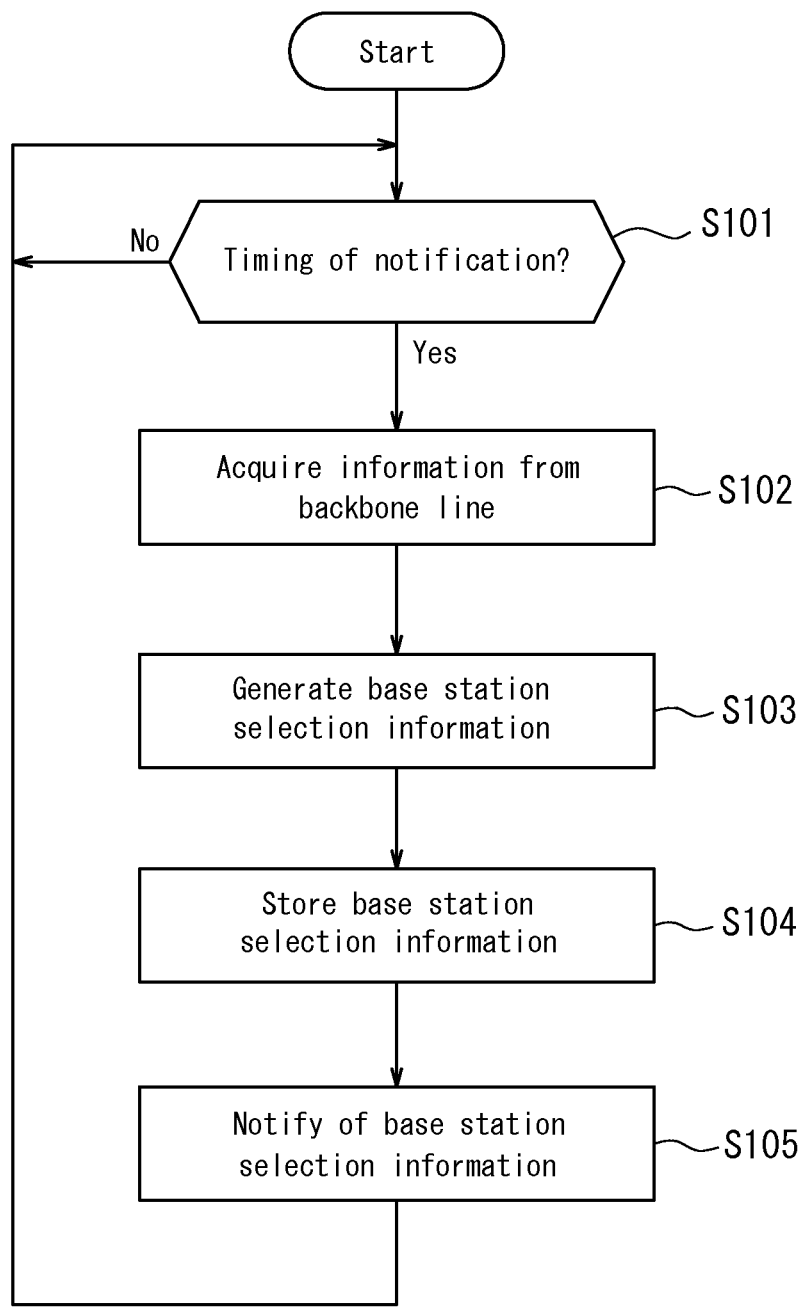
FIG. 6 is a flowchart illustrating an operation of the first communication apparatus of the radio communication system in FIG. 1.

Next, an operation of the communication system in FIG. 1 will be described. FIG. 6 is a flowchart illustrating an operation of the PHS base station 1 to transmit the base station selection information 106. First, the base station controller 105 of the PHS base station 1 determines whether it is time to periodically issue, on the control channel, the control information for allowing the dual terminal 3 and the PHS terminal 4 to connect to the PHS base station 1, based on time information or the like (step S101). When it is determined that it is not time to issue the control information, the operation returns to step S101. When it is determined that it is time to issue the control information, the operation proceeds to step S102.

When it is determined at step S101 that it is time to issue the control information, the backbone information acquisition unit 102 acquires the information about the backbone line from the backbone line of the base station of its own (step S102).

Subsequently, the base station selection information generation unit 103, based on the information acquired by the backbone information acquisition unit 102, generates the base station selection information 106 (step S103).

Next, the base station controller 105 stores the base station selection information 106 generated by the base station selection information generation unit 103 in the storage unit 104 (step S104).

Subsequently, the transmission unit 100 transmits the control information and the base station selection information 106 on the control channel (step S105), and the operation returns to step S101.

In this way, the PHS base station 1 transmits the base station selection information 106 indicating whether there is the 3G base station 2 sharing the backbone line. The dual terminal 3, by receiving the base station selection information 106, may identify the PHS base station 1 sharing the backbone line with the 3G base station 2.

Figure 7:
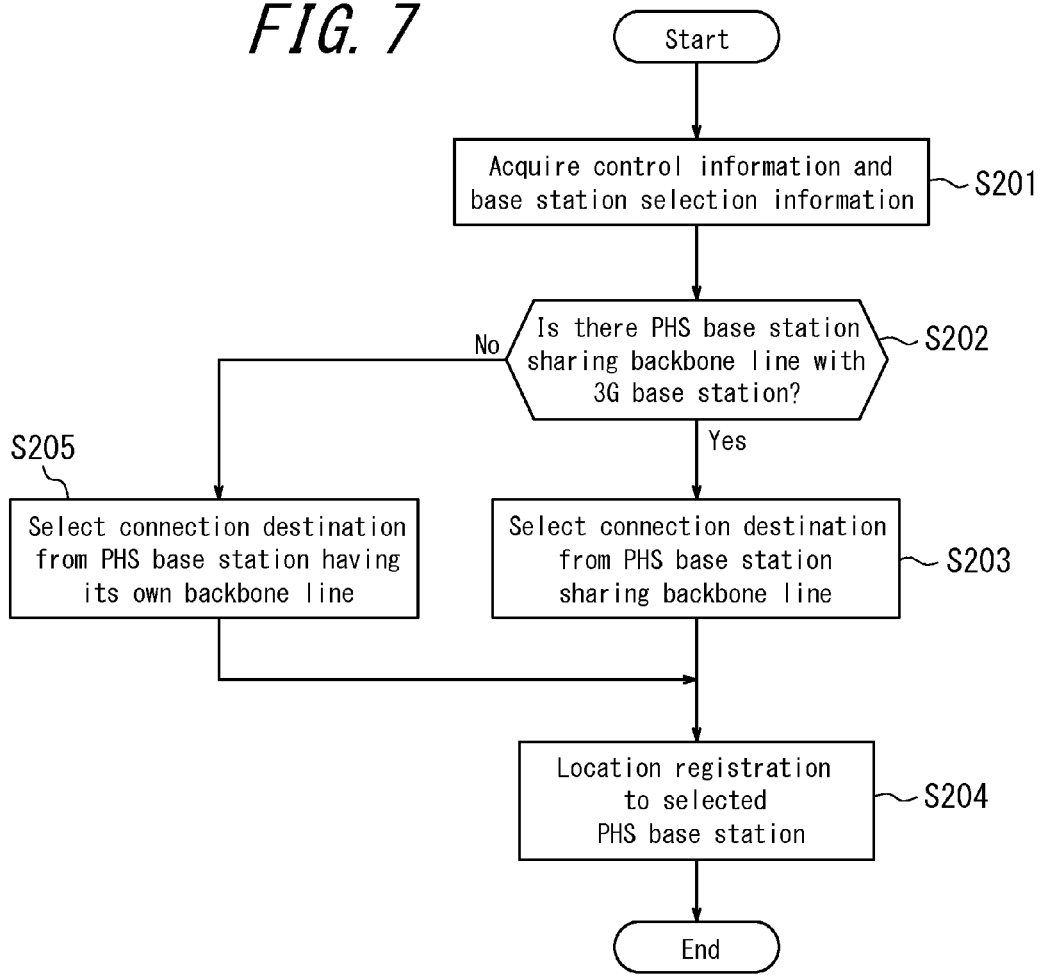
FIG. 7 is a flowchart illustrating an operation of the radio communication terminal corresponding to the second communication scheme of the radio communication system in FIG. 1.

FIG. 7 is a flowchart illustrating an operation of the dual terminal 3 in PHS operation of the radio communication system in FIG. 1. First, the PHS communication unit 30 of the dual terminal 3 receives a plurality of control information and a plurality of base station selection information 106 from a plurality of PHS base stations 1 (step S201).

Subsequently, the selection unit 32, based on the base station selection information 106 received by the PHS communication unit 30, detects whether there is the PHS base station 1 sharing the backbone line with the 3G base station 2 (step S202).

When the selection unit 32 detects one or more PHS base stations 1 sharing the backbone line at step S202, the selection unit 32 selects the connection destination therefrom (step S203). Preferably, the selection unit 32 preferentially selects the PHS base station 1 sharing the backbone line that has the shortest distance from the 3G base station 2 according to the distance 106-2.

On the other hand, when the selection unit 32 detects no PHS base station 1 sharing the backbone line at step S202, the selection unit 32 selects the connection destination from the PHS base station 1 having the backbone line of its own (step S205).

Subsequently, the terminal controller 33 carries out location registration to the base station selected by the selection unit 32 (step S204).

According to the present embodiment, as described above, the dual terminal 3 in PHS operation preferentially selects the PHS base station 1 sharing the backbone line with the 3G base station 2 as the connection destination. The dual terminal 3, such as when the communication quality is deteriorated after connection to the PHS base station 1, is highly likely to be able to connect to the 3G base station 2 by switching to 3G operation. Therefore, the handover of the dual terminal 3 from the PHS base station 1 to the 3G base station 2 may be facilitated, thereby improving frequency utilization efficiency of the entire radio communication system. Preferably, the dual terminal 3, when there are a plurality of PHS base stations 1 sharing the backbone line, preferentially selects the PHS base station 1 sharing the backbone line that has the shortest distance from the 3G base station 2 according to the distance 106-2. The dual terminal 3, when switching to the 3G operation after connecting to the PHS base station 1 in this manner, is highly likely to be able to connect to the 3G base station 2.

Figure 8:
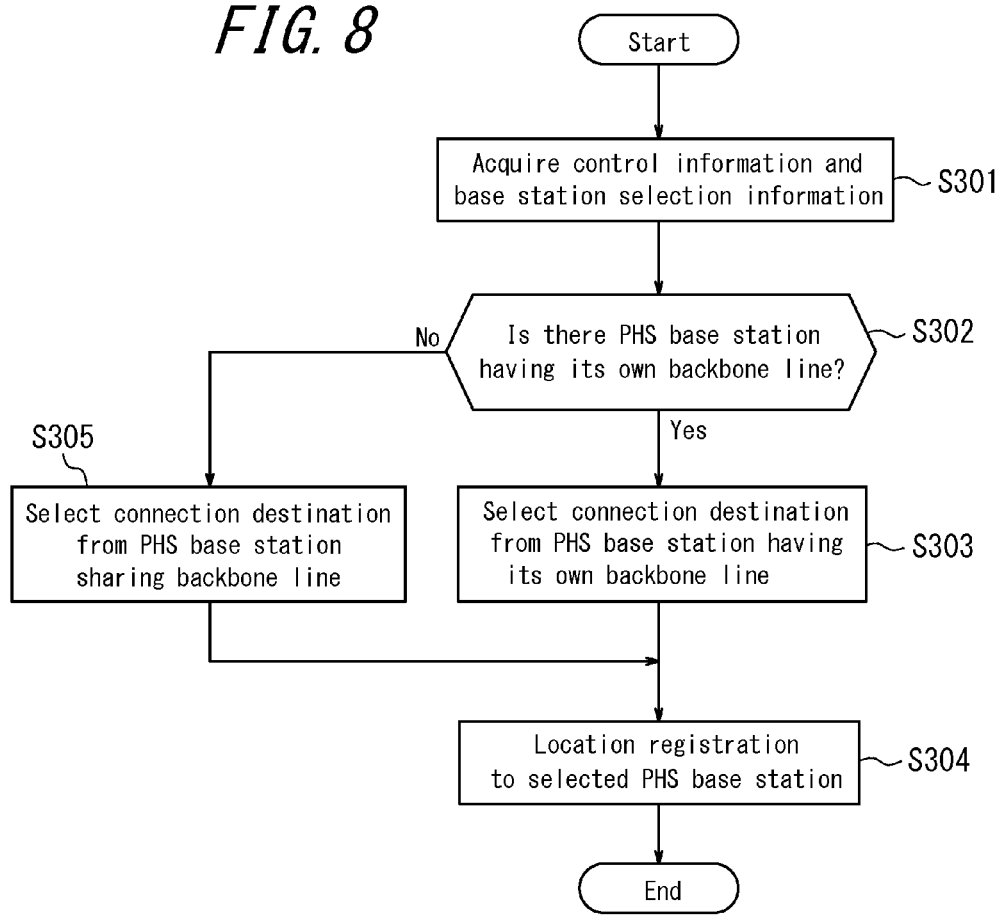
FIG. 8 is a flowchart illustrating an operation of the radio communication terminal non-corresponding to the second communication scheme of the radio communication system in FIG. 1.

FIG. 8 is a flowchart illustrating an operation of the PHS terminal 4 of the radio communication system in FIG. 1. First, the PHS communication unit 40 of the PHS terminal 4 receives a plurality of control information and a plurality of base station selection information 106 from a plurality of PHS base stations 1 (step S301).

Subsequently, the selection section 41, based on the base station selection information 106 received by the PHS communication unit 40, detects whether there is the PHS base station 1 having the backbone line of its own (step S302).

When one or more PHS base stations 1 having the backbone line of their own is detected at step S302, the selecting unit 41 selects the connection destination therefrom (step S303).

On the other hand, when the selection section 41 detects no PHS base station 1 having its own backbone line at step S302, the selection unit 41 selects the connection destination from the PHS base station(s) 1 sharing the backbone line with the 3G base station 2 (step S305). Preferably, the selection unit 41 preferentially selects the PHS base station 1 sharing the backbone line that has the longest distance from the 3G base station 2 according to the distance 106-2.

Then, the terminal controller 42 carries out the location registration to the base station selected by the selection unit 41 (step S304).

According to the present embodiment, as described above, the PHS terminal 4 preferentially selects the PHS base station 1 having the backbone line of its own as the connection destination. Therefore, interference between the dual terminal 3 and the PHS terminal 4 is reduced. Moreover, since the dual terminal 3 may easily connect to the PHS base station 1 sharing the backbone line with the 3G base station 2, the frequency utilization efficiency of the entire radio communication system may be improved.

Second Embodiment

Next, the radio communication system according to a second embodiment will be described. Since a configuration of the radio communication system according to the present embodiment is the same as that in FIG. 1, a description thereof will be omitted. Although the PHS base station 1 according to the present embodiment has the same configuration as that in FIG. 2, the base station controller 105 controls in a different manner.

The base station controller 105 of the PHS base station 1 according to the present embodiment, based on the information about whether there is the 3G base station sharing the backbone line with the PHS base station 1, carries out the connection control of the dual terminal 3 and the PHS terminal 4. In particular, the base station controller 105, when the base station of its own is sharing the backbone line with the 3G base station 2, carries out the connection control for allowing the dual terminal 3 to preferentially connect to the PHS base station 1. On the other hand, when the PHS base station 1 has the backbone line of its own, the base station controller 105 carries out the connection control for allowing the PHS terminal 4 to preferentially connect to the PHS base station 1. The connection control may be carried out by the base station controller 105 in cases such as, for example, (1) when the dual terminal 3 or the PHS terminal 4 specifies one of the communication schemes at the time of a connection request by employing the PHS communication scheme, (2) when the dual terminal 3 or the PHS terminal 4 is in a standby state and the PHS communication scheme is specified as the communication scheme employed for the next communication, (3) when, for the dual terminal 3 or the PHS terminal 4 in communication, the PHS communication scheme is specified as the communication scheme of the next communication, (4) when the base station controller 105 of the PHS base station 1 detects lack of a radio resource of the 3G base station sharing the backbone line, and the like.

Figure 9:
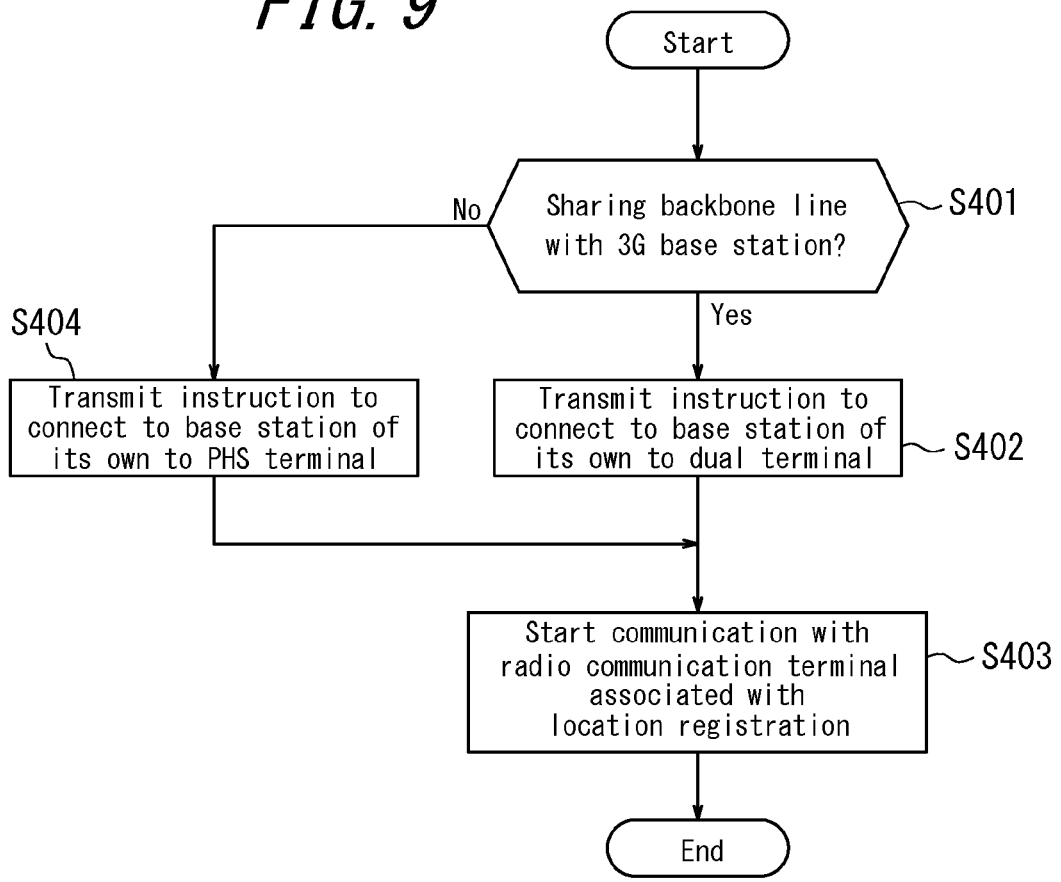
FIG. 9 is a flowchart illustrating an operation of the first communication apparatus of the radio communication system according to a second embodiment.

FIG. 9 is a flowchart illustrating an operation of the PHS base station 1 of the radio communication system according to the present embodiment. First, the base station controller 105 of the PHS base station 1 determines whether the base station of its own is sharing the backbone line with the 3G base station 2 (step S401). This determination may be made based on the base station selection information 106 stored in the storage unit 104, or on information newly acquired from the backbone line.

When it is determined at step S401 that the PHS base station 1 is sharing the backbone line with the 3G base station 2, a connection instruction to connect to the PHS base station 1 is transmitted to the dual terminal 3 (step S402).

On the other hand, when the PHS base station 1 has the backbone line of its own, the connection instruction to connect to the PHS base station 1 is transmitted to the PHS terminal 4 (step S404).

Subsequently, the base station controller 105 starts the communication with the radio communication terminal having registered location thereof to the PHS base station 1 (step S403).

According to the present embodiment, as described above, the PHS base station 1, based on whether the base station itself is sharing the backbone line with the 3G base station 2, transmits the connection instruction to connect to the base station itself to one of the dual terminal 3 and the PHS terminal 4. In this way, the PHS base station 1 reduces the interference and the like due to simultaneous connection of the dual terminal 3 and the PHS terminal 4 to the base station itself, thereby improving the frequency utilization efficiency of the entire radio communication system.

Exemplary Modification

Next, a radio communication system according to an exemplary modification will be described. A configuration of the radio communication system according to the exemplary modification is the same as that in FIG. 1, and a description thereof will be omitted. Also, the configuration of the PHS base station 1 and the configuration of the dual terminal 3 are the same as the configuration in FIG. 2 and the configuration in FIG. 4, respectively. However, the base station controller 105 and the terminal controller 33 control in manners different from those of the above embodiments.

The radio communication system according to the exemplary modification, in case of deterioration of the communication quality between the PHS base station 1 sharing the backbone line with the 3G base station 2 and the radio communication terminals (3 and 4), controls the dual terminal 3 to carry out the handover from the PHS base station 1 to the 3G base station 2.

In particular, the terminal controller 33 of the dual terminal 3 connected to the PHS base station 1 sharing the backbone line with the 3G base station 2, in case of deterioration of the quality of the communication with the PHS base station, carries out the handover to the 3G base station 2. Specifically, the base station controller 105 of the PHS base station 1, in case of deterioration of the quality of the communication with the dual terminal 3 or the PHS terminal 4 connected to the PHS base station 1 itself, transmits a handover instruction to carry out the handover to the 3G base station 2 to the dual terminal 3 connected to the PHS base station 1. Then, the terminal controller 33 of the dual terminal 3, when the PHS communication unit 30 receives the handover instruction from the PHS base station 1, carries out the handover to the 3G base station 2. The deterioration of the communication quality may be determined based on, for example, when the RSSI falls below a predetermined threshold.

According to the exemplary modification, as described above, in case of deterioration of the quality of the communication between the PHS base station 1 sharing the backbone line with the 3G base station 2 and the radio communication terminals (3 and 4), the dual terminal 3, which is highly likely to be able to connect to the 3G base station 2, carries out the handover to the 3G base station 2. Thereby, the frequency utilization efficiency of the entire radio communication system may be improved.

Although the present invention has been described based on the figures and the embodiments, it is to be understood that various modifications and changes may be implemented based on the present disclosure by those who are ordinarily skilled in the art. Accordingly, such modifications and changes are included in the scope of the present invention.

For example, although in the above embodiments the first communication scheme refers to the PHS communication scheme and the second communication scheme refers to the 3G communication scheme, the communication schemes are not limited thereto but may be, for example, LTE communication scheme, Wi-Fi communication scheme, and the like.

For example, although in the above embodiments the information is acquired from the backbone line (step S102) each time the PHS base station 1 issues the control information, the information may be acquired from the backbone line at any timing. For example, the information may be acquired at the time of startup of the PHS base station 1 and at any intervals thereafter.

For example, the PHS base station 1 having the backbone line of its own may store the number of times of connection from the dual terminal 3. Thereby, the backbone line may be shared preferentially with the PHS base station 1 having a higher number of times of the connection from the dual terminal 3.

For example, the PHS base station 1 may determine, based on the number of radio communication terminals connected thereto, an operation of another PHS base station 1 sharing the backbone line. For example, the PHS base station 1, when the number of radio communication terminals connected thereto exceeds a predetermined number, runs another PHS base station 1. Thereby, power consumption in the entire radio communication system may be reduced.

REFERENCE SIGNS LIST

1 PHS base station
10 PHS cell
100 transmission unit
101 reception unit
102 backbone information acquisition unit
103 base station selection information generation unit
104 storage unit
105 base station controller
106 base station selection information
2 3G base station
20 3G cell
3 dual terminal
30 PHS communication unit
31 3G communication unit
32 selection unit
33 terminal controller
4 PHS terminal
40 PHS communication unit
41 selection unit
42 terminal controller

The invention claimed is:

1. A radio communication system having a plurality of first radio communication apparatuses configured to use a first communication scheme, a second radio communication apparatus configured to use a second communication scheme, a first radio communication terminal configured to use the first communication scheme, and a second radio communication terminal configured to use both the first communication scheme and the second communication scheme, wherein the first radio communication apparatuses include at least one first radio communication apparatus sharing a backbone line with the second radio communication apparatus and at least one first radio communication apparatus not sharing the backbone line with the second radio communication apparatus, the first radio communication apparatus has a transmission unit configured to transmit information indicating whether the first radio communication apparatus is sharing the backbone line with the second radio communication apparatus, the second radio communication terminal has a selection unit configured to select the first radio communication apparatus sharing the backbone line with the second radio communication apparatus or the first radio communication apparatus not sharing the backbone line with the second radio communication apparatus as a connection destination based on the information, and the selection unit of the second radio communication terminal, in order to carry out a radio communication by employing the first communication scheme without carrying out searching by employing the second communication scheme, selects the first radio communication apparatus sharing the backbone line with the second radio communication apparatus as a connection destination from among the first radio communication apparatuses.

2. The radio communication system according to claim 1, wherein the information transmitted by the transmission unit contains a distance between the first radio communication apparatus and the second radio communication apparatus sharing the backbone line and the selection unit of the second radio communication terminal preferentially selects the first radio communication apparatus closer to the second radio communication apparatus.

3. The radio communication system according to claim 1, wherein the first radio communication apparatus has a storage unit for storing the information transmitted by the transmission unit and, based on the information stored in the storage unit, controls connection of the radio communication terminal connected to the first radio communication apparatus itself.

4. A radio communication terminal of a radio communication system having a plurality of first radio communication apparatuses configured to use a first communication scheme and a second radio communication apparatus configured to use a second communication scheme, the radio communication terminal comprising:

a selection unit configured to select the first radio communication apparatus sharing a backbone line with the second radio communication apparatus or the first radio communication apparatus not sharing the backbone line with the second radio communication apparatus as a connection destination based on information indicating whether the backbone line is shared between the first radio communication apparatus and the second radio communication apparatus, wherein the selection unit, in order to carry out a radio communication by employing the first communication scheme without carrying out searching by employing the second communication scheme, selects the first radio communication apparatus sharing the backbone line with the second radio communication apparatus as the connection destination from among the first radio communication apparatuses.

5. A radio communication apparatus,
serving as a first radio communication apparatus configured to use a first communication scheme, and
having a transmission unit configured to transmit information to a radio communication terminal, the information indicating whether the first radio communication apparatus itself is sharing a backbone line with a second communication apparatus configured to use a second communication scheme, wherein
the information transmitted by the transmission unit contains a distance between the first radio communication apparatus and the second radio communication apparatus sharing the backbone line.

6. The radio communication apparatus according to claim 5, comprising a storage unit for storing the information transmitted by the transmission unit and, based on the information stored in the storage unit, controlling connection of the radio communication terminal connected to the radio communication apparatus itself.

* * * * *